United States Patent
Gafni et al.

(10) Patent No.: US 10,623,316 B2
(45) Date of Patent: Apr. 14, 2020

(54) SCALING OF SWITCHING TABLES WITH HIGH BANDWIDTH

(71) Applicant: Mellanox Technologies TLV Ltd., Raanana (IL)

(72) Inventors: Barak Gafni, Campbell, CA (US); Gil Levy, Hod Hasharon (IL); Aviv Kfir, Nili (IL)

(73) Assignee: Mellanox Technologies TLV Ltd., Raanana (IL)

( * ) Notice: Subject to any disclaimer, the term of this patent is extended or adjusted under 35 U.S.C. 154(b) by 132 days.

(21) Appl. No.: 15/717,964

(22) Filed: Sep. 28, 2017

(65) Prior Publication Data

US 2018/0316613 A1 Nov. 1, 2018

Related U.S. Application Data

(60) Provisional application No. 62/490,628, filed on Apr. 27, 2017.

(51) Int. Cl.
| | | |
|---|---|---|
| *H04L 12/743* | (2013.01) | |
| *H04L 12/44* | (2006.01) | |
| *H04L 12/721* | (2013.01) | |
| *H04L 12/931* | (2013.01) | |
| *H04L 12/851* | (2013.01) | |
| *H04L 12/741* | (2013.01) | |
| *H04L 12/745* | (2013.01) | |
| *H04L 12/775* | (2013.01) | |

(52) U.S. Cl.
CPC .......... *H04L 45/7457* (2013.01); *H04L 12/44* (2013.01); *H04L 45/44* (2013.01); *H04L 45/54* (2013.01); *H04L 47/2441* (2013.01); *H04L 49/355* (2013.01); *H04L 45/58* (2013.01); *H04L 45/748* (2013.01)

(58) Field of Classification Search
None
See application file for complete search history.

(56) References Cited

U.S. PATENT DOCUMENTS

| | | | |
|---|---|---|---|
| 7,245,623 B1 | 7/2007 | Cheriton | |
| 2010/0265849 A1* | 10/2010 | Harel | H04L 12/462 370/256 |
| 2015/0071286 A1* | 3/2015 | de Silva | H04L 45/586 370/392 |
| 2015/0172222 A1* | 6/2015 | Liao | H04L 49/356 370/392 |
| 2018/0302321 A1* | 10/2018 | Manthiramoorthy | H04L 12/4633 |
| 2019/0075053 A1* | 3/2019 | Yu | H04L 61/2007 |
| 2019/0141010 A1* | 5/2019 | Chander | H04L 45/02 |

\* cited by examiner

*Primary Examiner* — Jutai Kao
(74) *Attorney, Agent, or Firm* — Kligler & Associates Patent Attorneys Ltd

(57) ABSTRACT

Packet classification apparatus includes a plurality of switches, including one or more leaf switches and one or more spine switches, each including a memory configured to hold packet classification entries. The ports of the leaf switches include external ports for connection to a packet network and internal ports, which are connected to the ports of at least one of the spine switches. The packet classification entries are selected from a database, which includes an outer partition, which is stored in the memory of the leaf switches, and at least one inner partition, which is stored in the memory of the one or more spine switches.

35 Claims, 3 Drawing Sheets

SCALING OF SWITCHING TABLES WITH HIGH BANDWIDTH

CROSS-REFERENCE TO RELATED APPLICATION

This application claims the benefit of U.S. Provisional Patent Application 62/490,628, filed Apr. 27, 2017, which is incorporated herein by reference.

FIELD OF THE INVENTION

The present invention relates generally to data structures and their storage, and particularly to methods and apparatus for efficient storage and lookup of packet classification rules.

BACKGROUND

Packet-transfer devices in high-speed data networks, such as switches and routers, are required to perform flexible and sophisticated packet classification functions at high speed. For example, Internet routers make packet forwarding decisions by searching for the destination Internet Protocol (IP) addresses of incoming packets in a database known as a routing table. The routing table, rather than storing the full IP addresses, stores only some of the leading portion, known as a prefix. For each incoming packet, the router searches the table for the most specific of the matching table entries, referred to as the longest prefix match (LPM), in which the largest number of leading address bits of the destination IP address match those in the packet.

As another example, many packet-transfer devices apply access control lists (ACLs) in filtering network traffic, and particularly in preventing certain traffic from entering or exiting a network. The filtering criteria listed in the ACL are commonly in the form of classification rules based on packet header information, such as IP source and destination addresses, as well as higher-level protocol information, such as transport-layer port numbers. Many advanced switches and routers have a management interface, which a system administrator can use to program and update the ACL, as well as other data structures and functions.

Classification rules used by a switch or router are typically held in a memory, such as static random-access memory (SRAM) or ternary content-addressable memory (TCAM), as are known in the art. Various schemes have been proposed to promote efficient use of and access to such memory.

For example, U.S. Pat. No. 7,245,623 describes a system and method provide for efficient classification of long strings of data, such as network messages, using hierarchical parallel banks of associative memories. The system, which may be a classification engine for use in a network device, is includes one or more stages having one or more banks of TCAM, which are organized into one or more groups, each processing network messages for a different set of ports of the network device. The system further includes at least one memory resource that is shared by the TCAM banks of all groups. The system is said to process network messages at high speed while minimizing the number of required components.

SUMMARY

Embodiments of the present invention that are described hereinbelow provide improved apparatus and methods for storing and applying packet classification rules.

There is therefore provided, in accordance with an embodiment of the invention, packet classification apparatus, which includes a plurality of switches, including one or more leaf switches and one or more spine switches. Each of the switches includes multiple ports, a memory configured to hold packet classification entries, and classification and switching logic, coupled to receive packets from the ports, to match the received packets to the packet classification entries in the memory, and to forward the received packets through the ports responsively to the matching packet classification entries. The ports of the one or more leaf switches include external ports for connection to a packet network and internal ports, which are connected to the ports of at least one of the spine switches. The packet classification entries are selected from a database, which includes an outer partition, which is stored in the memory of the one or more leaf switches, and at least one inner partition, which is stored in the memory of the one or more spine switches.

Typically, the classification and switching logic of the one or more leaf switches is configured, upon matching a received packet to an entry in the outer partition, to forward the received packet through one of the external ports responsively to the matching entry, and otherwise to forward the received packet through one of the internal ports for handling by one of the spine switches.

Additionally or alternatively, the one or more spine switches are configured, upon receiving a packet through one of the internal ports, to match the received packet to one of the entries in the at least one inner partition, and then to return the received packet, responsively to the matching entry, to one of the leaf switches for forwarding to the packet network.

In some embodiments, the one or more spine switches include at least one first spine switch and at least one second spine switch, and the at least one inner partition includes at least one first partition, which is stored in the memory of the at least one first spine switch, and at least one second partition, which is stored in the memory of the at least one second spine switch. In a disclosed embodiment, the at least one first spine switch and the at least one second spine switch are arranged respectively in first and second tiers, such that the ports of the at least one first spine switch include first ports that are connected to the internal ports of the one or more leaf switches, and second ports that are connected to the ports of the at least one second spine switch. The classification and switching logic of the at least one first spine switch is configured, upon matching a received packet to an entry in the at least one first partition, to forward the received packet through one of the first ports responsively to the matching entry, and otherwise to forward the received packet via one of the second ports for handling by the at least one second spine switch.

Alternatively, the ports of both the at least one first spine switch and the at least one second spine switch are connected to the internal ports of the one or more leaf switches, and the classification and switching logic of the one or more leaf switches is configured, upon failing to match a received packet to any of the entries in the outer partition, to apply a predefined rule to the received packet in order to select one of the spine switches and to forward the received packet through one of the internal ports to the selected one of the spine switches.

In some embodiments, the one or more leaf switches include multiple leaf switches, and the memory of each of the leaf switches contains a respective copy of the outer partition. In one embodiment, the one or more spine switches include multiple spine switches, which are each connected to at least one of the internal ports of every one of the leaf switches.

In disclosed embodiments, the switches all include identical integrated circuit components, and the memory is selected from a set of memory types consisting of static random-access memory (SRAM) and ternary content-addressable memory (TCAM).

In some embodiments, the classification and switching logic is configured to discard at least some of the received packets responsively to the packet classification entries in the memory.

Additionally or alternatively, the classification and switching logic is configured to extract a respective key from each of the received packets and to perform a longest-prefix match between the key and the packet classification entries in the memory.

There is also provided, in accordance with an embodiment of the invention, a method for packet classification, which includes providing a hierarchical arrangement of switches, including one or more leaf switches and one or more spine switches, each of the switches including multiple ports and a memory, the ports of the one or more leaf switches including external ports for connection to a packet network and internal ports, which are connected to the ports of at least one of the spine switches. A database of packet classification entries is partitioned into an outer partition and at least one inner partition. The outer partition is stored in the memory of each of the one or more leaf switches, and the at least one inner partition is stored the memory of each of the one or more spine switches. Packets are received from the packet network through the external ports of the one or more leaf switches. The received packets are matched to the packet classification entries in the memory of at least one of the leaf and spine switches and are forwarded through the ports responsively to the matching packet classification entries.

The present invention will be more fully understood from the following detailed description of the embodiments thereof, taken together with the drawings in which:

DETAILED DESCRIPTION OF EMBODIMENTS

Figure 1A:
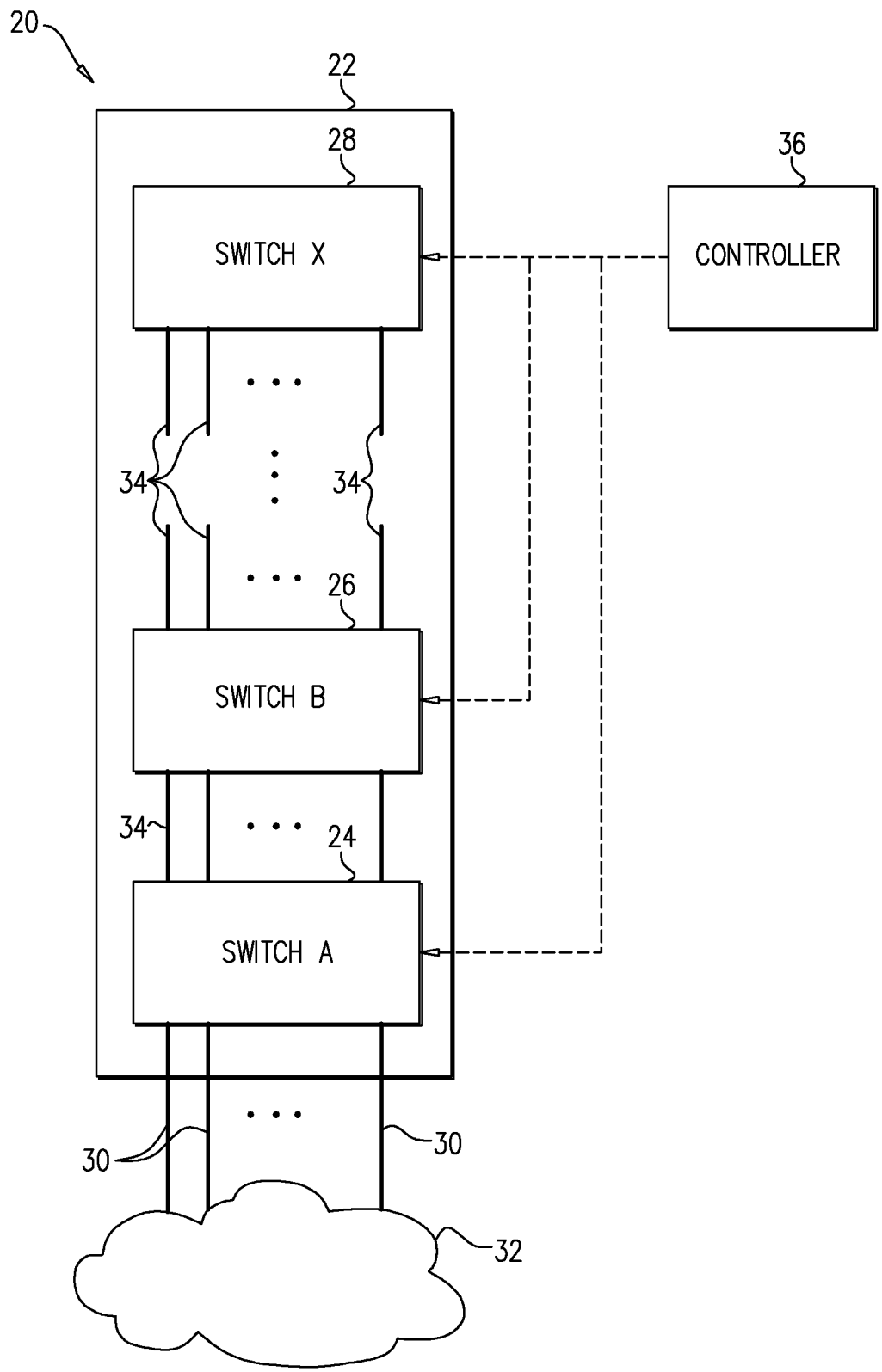
FIG. 1A is a block diagram that schematically illustrates packet classification apparatus, in accordance with an embodiment of the invention.

As the size and speed of networks grow, the demands on the memory used by switches in such networks, in terms of memory size and speed, grow concomitantly. On-board memory within the switch is preferable for achieving higher bandwidth, but table size requirements may exceed the physical area available on a single-chip switch. These conflicting demands impose difficult tradeoffs between table size, bandwidth, power consumption and cost.

Embodiments of the present invention that are described herein address these difficulties using a hierarchical arrangement of switches, which are interconnected within the hierarchy by the switch ports. Each switch in the hierarchy has its own memory, and a database of packet classification entries is partitioned among the switches and stored accordingly in the switch memories. Classification and switching logic within each of the switches matches packets received through the ports of the switch to the packet classification entries in the memory, and forwards the received packets through the ports accordingly. Otherwise, when no match is found to an entry in the database partition that is held in one level of the hierarchy, the received packet is forwarded through the switch ports for handling in another level.

This arrangement can be used in implementing a wide variety of network functions involving table lookup, such as packet routing, forwarding, and access control lists (ACLs). It is advantageous, inter alia, in that the hierarchy can be built up from a set of identical switch components, such as identical integrated circuits (ICs), which communicate with one another using a standard protocol, such as Ethernet. Thus, the system designer can choose the topology and number of tiers in the hierarchy in a manner that enables database lookup at substantially any desired bandwidth, up to the full bandwidth of the network to which the switches are connected, with a sufficient number of switches to contain a database of substantially any desired size. The switches can comprise any suitable sort of memory, such as SRAM or TCAM, and can support any suitable sort of matching algorithms, such as exact matching, LPM, or maskable matching schemes. The partitioning of a database in this manner among multiple, identical ICs, running a standard protocol, provides a low-cost, efficient solution, which alleviates the need for high-speed external memory.

In the disclosed embodiments, packet classification apparatus comprises multiple switches, including one or more leaf switches and one or more spine switches. The ports of the leaf switches include external ports for connection to a packet network and internal ports, which are connected to the ports of one or more of the spine switches. (The spine switches may be arranged in one or more tiers, with their ports interconnected accordingly, but in any case communicate with the packet network through the leaf switches.) Each of the switches holds packet classification entries selected from a database, with an outer partition of the database stored in the memory of the leaf switches, and one or more inner partitions stored in the memory of the spine switches. (The terms "inner" and "outer" are used, for the sake of clarity, to distinguish between the different partitions but have no other intrinsic meaning in the present context.) Typically, although not necessarily, the database is partitioned by a system operator in such a way that the inner and outer partitions together comprise all of the packet classification entries in the database.

When the classification and switching logic of a leaf switch matches a received packet to an entry in the outer partition, the logic forwards the received packet back to the network through one of the external ports of the switch, in accordance with the matching entry. Otherwise, the leaf switch forwards the received packet through one of its internal ports to one of the spine switches for lookup and handling. Upon receiving a packet from a leaf switch, the classification and switching logic in the spine switch attempts to match the received packet to one of the entries in the inner partition held by the spine switch, and then returns the received packet accordingly to one of the leaf switches for forwarding to the packet network. In some cases, the classification and switching logic in a leaf or spine switch will discard at least some of the received packets, for example when no matching database entry is found, or when an ACL entry indicates that network access is to be denied.

In most applications, it is advantageous that the outer partition contain the packet classification entries having the highest priority, so that packets matching these entries will be forwarded by the leaf switches immediately back to the network. The partitions can be arranged in this case so that relatively few packets will be passed through to the spine switches. Alternatively, it can be advantageous in some embodiments to pass all incoming packets through to the spine switches for initial matching, after which the packets are returned to the leaf switches for further lookup, if needed, and forwarding to the network. Using this latter approach, all packets will be handled with the same latency regardless of whether they match an entry in a spine switch or a leaf switch.

Figure 1B:
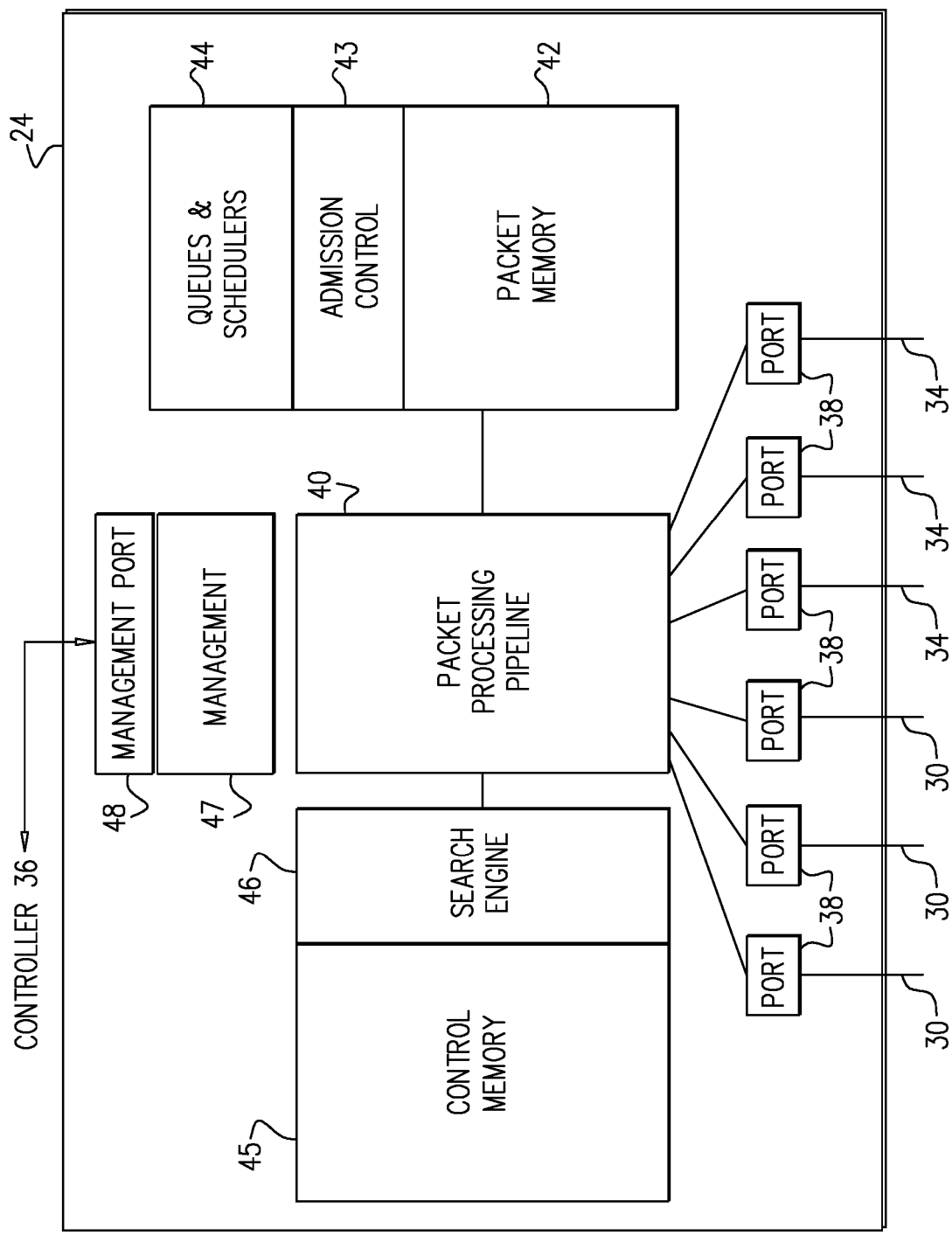
FIG. 1B is a block diagram that schematically shows details of a switch used in the apparatus of FIG. 1A, in accordance with an embodiment of the invention.

Reference is now made to FIGS. 1A and 1B, which schematically illustrate packet classification apparatus 20, in accordance with an embodiment of the invention. FIG. 1A is a block diagram showing the overall topology of the apparatus, while FIG. 1B is a block diagram showing details of a switch 24 used in apparatus 20. Although for the sake of brevity, only switch 24 is shown in detail and described explicitly hereinbelow, the other switches 26, 28, . . . , in apparatus 20 can be of similar or identical overall design to switch 24. The specific design of switch 24 that is shown in FIG. 1B is described here by way of example, for the sake of concreteness and clarity as to how the functions of apparatus 20 could be carried out in one particular embodiment. Alternative designs of switches 24, 26, 28, . . . , that are capable of carrying out these functions will be apparent to those skilled in the art after reading the present description and are considered to be within the scope of the present invention.

Apparatus 20 comprises a hierarchical multi-switch module 22, comprising switches 24, 26, 28, . . . , (labeled switch A through switch X) in a tower topology. Switch 24 is configured as a leaf switch, which is connected by external links 30 to a packet network 32, while switches 26, 28, . . . , are configured as spine switches, interconnected as shown in FIG. 1A by internal links 34. Generally speaking, module 22 may comprise any suitable number of tiers of spine switches, including only one tier (i.e., only switch 26), or two or more tiers, as a function of the size of the database that is to be partitioned among the switches. Module 22 may be configured and programmed to fulfill a variety of network functions, for example serving as a bridge, a router, or an ACL controller, depending on system configuration and the contents of the packet classification database that is partitioned among switches 24, 26, 28, . . . .

As shown in FIG. 1B, switch 24 comprises multiple ports 38, which receive data packets into the switch and forward data packets onward to network 32 or to the other switches in module 22. Ports 38 typically comprise physical-layer interface (PHY) and medium access control (MAC) circuits, such as standard Ethernet PHY and MAC circuits, which receive and transmit packets over links 30 and 34, as is known in the art. In the case of switch 24, which is configured as a leaf switch, ports 38 that connect to external links 30 serve as external ports, connecting module 22 to packet network 32, while ports 38 connecting to internal links 34 serve as internal ports. All of the ports of the spine switches serve as internal ports.

Switch 24 (and likewise switches 26, 28, . . . ) comprises a control memory 45, comprising SRAM and/or TCAM, for example, which contains packet classification entries. A controller 36 programs control memory 45 in each of switches 24, 26, 28, . . . , with entries belonging to a respective partition of a database, such as a forwarding, routing, or ACL database. The partition held in leaf switch 24 is referred to herein as the outer partition of the database, while spine switches 26, 28, . . . , hold respective inner partitions. Controller 36 communicates with management processors 47 in switches 24, 26, 28, . . . , via respective management ports 48, in order to control various functions of the switches, including loading the appropriate entries into memory 45 of each switch and updating the entries as appropriate. Controller 36 typically comprises a host computer, for example, which is programmed in software to perform these functions and communicates with management ports 48 by transmitting management packets over network 32 or via a dedicated control network.

Switch 24 comprises classification and switching logic, in the form of a packet processing pipeline 40, which receive packets from ports 38, and a search engine 46, which is invoked by pipeline 40 in order to match the received packets to the packet classification entries in memory 45. Upon receiving a packet via one of ports 38, packet processing pipeline 40 passes the packet payload (and possibly the header, as well) for buffering to a packet memory 42. Admission control logic 43 verifies that there is sufficient space for the packet in memory and, if not, may discard the packet. Meanwhile, packet processing pipeline 40 extracts a respective key from the received packet, typically comprising the values of one or more fields in the packet header, and passes the key to search engine 46 for matching to the entries in memory 45. For example, search engine 46 may perform a longest-prefix match between the key and the packet classification entries in memory 45, or may carry out any other suitable sort of matching algorithm.

Upon finding a matching entry in memory 45, search engine 46 looks up and returns the result to pipeline 40, which will forward the packet accordingly through one of ports 38 that is indicated by the lookup result. Pipeline 40 may also perform other functions that are indicated by the lookup results, such as modifying packet headers and discarding packets that are not to be forwarded. When search engine 46 in switch 24 fails to find a matching entry in memory 45 for a given packet, pipeline 40 will generally forward the packet through one of the internal ports, via one of links 34, to spine switch 26. In any case, once pipeline 40 has selected the port 38 through which a given packet is to be forwarded, a queuing engine and scheduler 44 stores and schedules the packet for transmission through the port.

The classification and switching functions of switches 24, 26, 28, . . . , are typically implemented in hardware logic in a single IC chip, such as an application-specific integrated circuit (ASIC) or a field-programmable gate array (FPGA) or a full-custom chip, which also includes control memory 45 and other functional components within the chip. Module 22 comprises a suitable substrate, such as a printed circuit board or a multi-chip module, with interconnects defining links 30 and 34, as well as external connections. Alternatively, switches 24, 26, 28, . . . , may be fabricated together as parts of a single integrated circuit.

As noted earlier, when search engine 46 in leaf switch 24 succeeds in matching a received packet to an entry in the outer partition of the database that is stored in control memory 45 of the leaf switch, packet processing pipeline 40 will typically select one of the external ports (i.e., one of ports 38 that connects to an external link 30), and will forward the received packet back to network via the selected port. Otherwise, pipeline 40 will forward the received packet through one of the internal ports (i.e., one of ports 38 that connects to an internal link 34) for handling by spine switch 26.

Upon receiving the packet in spine switch 26, search engine 46 in the spine switch will similarly attempt to match the received packet to one of the entries in the inner partition of the database that is stored in memory 45 of the spine switch. Depending on the results of the search, pipeline 40 in switch 26 will select one of ports 38 through which the packet should be forwarded. If search engine 46 finds a match, pipeline 40 will select a port so as to return the packet to leaf switch 24, which will in turn forward the packet to network 32 without further processing in the leaf switch. (For this purpose, it can be advantageous to pair the internal ports of the leaf switch one-to-one with the external ports, in which case the leaf switch need only pass outgoing packets through from the internal ports to the corresponding external ports.) Otherwise, assuming module 22 comprises multiple tiers of spine switches as shown in FIG. 1A (switches B, C, D, . . . , X), pipeline 40 in switch 26 will select a port 38 so as to forward the packet to the next spine switch (in this case, switch C, which is not shown) up in the hierarchy.

This next spine switch will perform the same sort of search on the inner partition held in its memory 45, and will forward the packet back down or up the hierarchy depending on whether or not a match is found, and so on up to the final tier (switch X in FIG. 1A). If no match for a given packet is found even in the final tier, it means that there is no database entry corresponding to the key of this packet, and the packet will then be discarded or possibly forwarded back down the hierarchy to a default address. In general, however, it is advantageous to write and configure the entries so that all packets reaching the final tier will find a match, for example by including a default rule in memory 45 of switch X.

The packet switching bandwidth of module 22 is effectively half the design bandwidth of switches 24, 26, 28, . . . , since only half of ports 38 of leaf switch 24 are available externally for receiving and transmitting packets from and to network 32, while the remaining ports are used internally. To maintain full use of the available bandwidth, packet processing pipeline 40 in each of the switches may be programmed to prevent collisions between inbound packets (traveling upward through the hierarchy) and outbound packets (traveling downward), for example by constraining each packet to traverse through a certain, respective port number. For this purpose, the port numbers may conveniently be assigned so that each port number is shared by one upward-facing port and one downward-facing port. Notwithstanding the bandwidth limitation, for a hierarchy of N switches in the "tower" configuration that is shown in FIG. 1A, module 22 can hold and apply a database that is N times the size of memory 45 in any single switch. Alternatively, the division of ports 38 of leaf switch 24 between external and internal ports need not be equal; for example, when the database entries are divided between the inner and outer partitions in such a way that a relatively small fraction of packets will have to be passed through to a spine switch, the bandwidth of the module can be increased by using a larger number of the ports as external ports, and fewer as internal ports.

Figure 2:
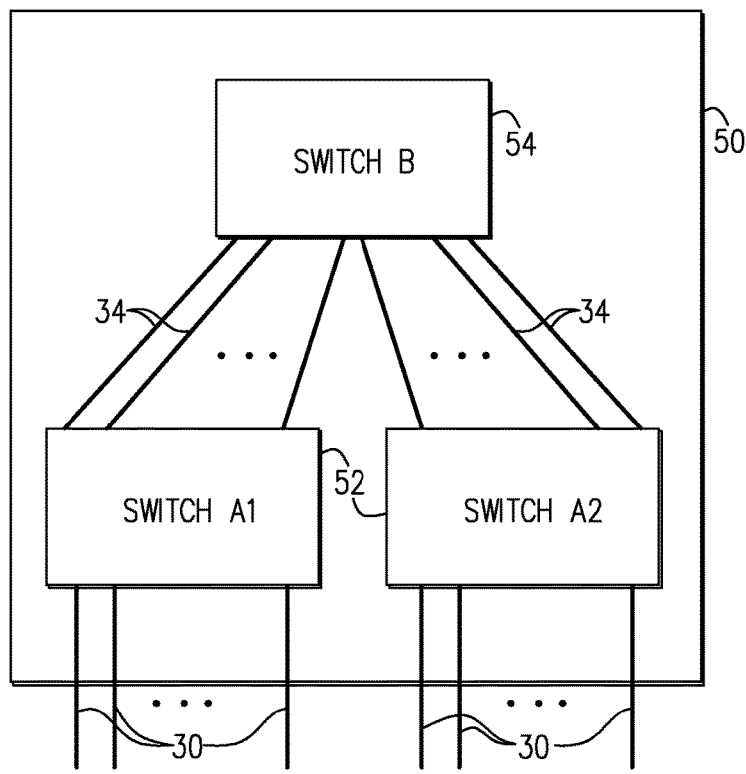
FIGS. 2 and 3 are block diagrams that schematically illustrate packet classification apparatus in accordance with other embodiments of the invention.

FIG. 2 is a block diagram that schematically illustrates a packet classification module 50 in accordance with another embodiment of the invention. The approach illustrated in this figure can be used to overcome the bandwidth limitation of the preceding embodiment. Module 50 comprises multiple leaf switches 52, which are connected by internal links 34 to a single spine switch 54. Half the ports of leaf switches 52 connect to a network via external links 30, while the remaining ports connect via internal links 34 to switch 54 (although as noted above, other, unequal divisions between external and internal ports can be used). As in the preceding embodiment, switches 52 and can be identical IC components, with structure and functionality similar to those of switch 24, as shown in FIG. 1B.

Memory 45 of switch 54 holds a single copy of the inner partition of the packet classification database, while the memory of each of leaf switches 52 contains a respective copy of the same outer partition. As in the preceding embodiment, upon failing to find a match to a received packet in memory 45, leaf switches 52 will forward the packet via internal links 34 to spine switch 54 for handling. The duplication of functionality between leaf switches 52 ensures that module 50 will be capable of handling incoming packets at the full bandwidth for which switches 52 and 54 are designed, but it limits the size of the database to roughly twice the size of memory 45, despite the use of three switches in module 50. Alternatively, leaf switches 52 may hold different, respective outer partitions.

As in the preceding embodiment, it is generally advantageous (but not mandatory) that the higher-priority packet classification entries be assigned to the outer partition held by leaf switches 52. Although only two leaf switches are shown in FIG. 2, in alternative embodiments, larger numbers of leaf switches may be used to increase bandwidth still further.

Figure 3:
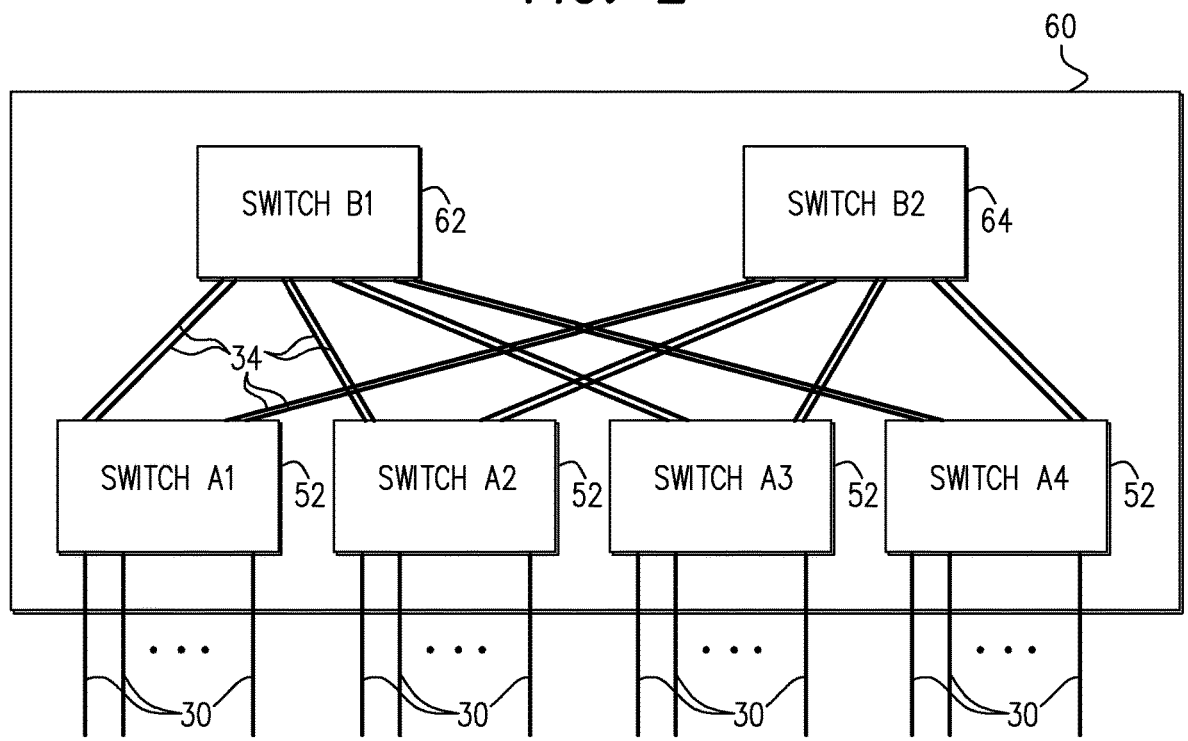

FIG. 3 is a block diagram that schematically illustrates a packet classification module 60 in accordance with yet another embodiment of the invention. Module 60 comprises multiple spine switches 62, 64, which are connected in a Clos topology by internal links 34 to the internal ports of every one of leaf switches 52. Assuming leaf switches 52 to contain the same outer partition of the packet classification database, and spine switches 62, 64 to contain the same inner partition, module 60 can support the same database size as module 50 (FIG. 2), but with twice the bandwidth.

As another alternative, switches 62 and 64 may contain different, respective inner partitions (assuming these partitions contain entries that are not accessed very often and therefore need not support the full bandwidth of module 60). In this case, the classification and switching logic in leaf switches 52, upon failing to match the received packet to any of the entries in the outer partition, will apply a predefined rule to the received packet in order to select one of spine switches 62 or 64, and will then forward the packet through one of the internal ports to the selected spine switch. For example, memory 45 may contain one or more dedicated entries according to which leaf switches 52 will select the appropriate spine switch to handle any give packet.

Although certain simple topologies of switch interconnections are shown in the figures and described above, the principles of the present invention may similarly be applied in other topologies, using smaller or larger numbers of switches. For example, the topologies of modules 50 and 60 may be extended to include multiple tiers of spine switches (as in module 22), which may be interconnected either in a Clos network or in any other suitable arrangement. The number and arrangement of switches and their respective ports may be chosen, together with the database partitioning scheme, to support a packet classification database of substantially any size, with substantially any desired access bandwidth (subject to constraints of cost and size). All such alternative implementations are considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Packet classification apparatus, comprising:
   a plurality of switches, including one or more leaf switches and one or more spine switches, each of the switches comprising:
   multiple ports including physical layer and medium access control circuits;
   a memory configured to hold packet classification entries; and
   classification and switching logic, coupled to receive packets from the ports, to match the received packets to the packet classification entries in the memory, and to forward the received packets through the ports responsively to the matching packet classification entries,
   wherein the ports of the one or more leaf switches comprise external ports for connection to a packet network and internal ports, which are connected to the ports of at least one of the spine switches, and
   a controller configured to load packet classification entries of an outer partition of a database partitioned into an outer partition and at least one inner partition, into the memory of the one or more leaf switches, and to load the at least one inner partition, into the memory of the one or more spine switches.

2. The apparatus according to claim 1, wherein the classification and switching logic of the one or more leaf switches is configured, upon matching a received packet to an entry in the outer partition, to forward the received packet through one of the external ports responsively to the matching entry, and otherwise to forward the received packet through one of the internal ports for handling by one of the spine switches.

3. The apparatus according to claim 1, wherein the one or more spine switches are configured, upon receiving a packet through one of the internal ports, to match the received packet to one of the entries in the at least one inner partition, and then to return the received packet, responsively to the matching entry, to one of the leaf switches for forwarding to the packet network.

4. The apparatus according to claim 1, wherein the one or more spine switches comprise at least one first spine switch and at least one second spine switch, and wherein the at least one inner partition comprises at least one first partition, which is stored in the memory of the at least one first spine switch, and at least one second partition, which is stored in the memory of the at least one second spine switch, wherein the at least one second partition includes different entries from those in the at least one first partition.

5. The apparatus according to claim 4, wherein the at least one first spine switch and the at least one second spine switch are arranged respectively in first and second tiers, such that the ports of the at least one first spine switch comprise first ports that are connected to the internal ports of the one or more leaf switches, and second ports that are connected to the ports of the at least one second spine switch,
   wherein the classification and switching logic of the at least one first spine switch is configured, upon matching a received packet to an entry in the at least one first partition, to forward the received packet through one of the first ports responsively to the matching entry, and otherwise to forward the received packet via one of the second ports for handling by the at least one second spine switch.

6. The apparatus according to claim 4, wherein the ports of both the at least one first spine switch and the at least one second spine switch are connected to the internal ports of the one or more leaf switches, and
   wherein the classification and switching logic of the one or more leaf switches is configured, upon failing to match a received packet to any of the entries in the outer partition, to apply a predefined rule to the received packet in order to select one of the spine switches having entries appropriate to handle the received packet and to forward the received packet through one of the internal ports to the selected one of the spine switches.

7. The apparatus according to claim 1, wherein the one or more leaf switches comprise multiple leaf switches, and wherein the memory of each of the leaf switches contains a respective same copy of the outer partition.

8. The apparatus according to claim 7, wherein the one or more spine switches comprise multiple spine switches, which are each connected to at least one of the internal ports of every one of the leaf switches.

9. The apparatus according to claim 1, wherein the switches all comprise identical integrated circuit components.

10. The apparatus according to claim 1, wherein the memory is selected from a set of memory types consisting of static random-access memory (SRAM) and ternary content-addressable memory (TCAM).

11. The apparatus according to claim 1, wherein the classification and switching logic is configured to discard at least some of the received packets responsively to the packet classification entries in the memory.

12. The apparatus according to claim 1, wherein the classification and switching logic is configured to extract a respective key from each of the received packets and to perform a longest-prefix match between the key and the packet classification entries in the memory.

13. The apparatus according to claim 1, wherein the entries in the database are partitioned into the outer partition and the inner partition, at least partially responsive to respective priorities of the entries.

14. The apparatus according to claim 1, wherein the plurality of switches are arranged in a tower topology including only a single leaf switch.

15. The apparatus according to claim 1, wherein the plurality of switches are included in a single integrated circuit chip.

16. The apparatus according to claim 1, wherein the one or more leaf switches are configured to forward packets received through the internal ports to respective external ports, without further processing in the leaf switch.

17. The apparatus according to claim 1, wherein the one or more leaf switches are configured to forward packets received through the internal ports to respective external ports, in accordance with a one-to-one pairing of the internal ports to respective external ports.

18. The apparatus according to claim 1, wherein the multiple ports of the switches comprise Ethernet physical layer and medium access control circuits.

19. The apparatus according to claim 1, wherein the one or more spine switches comprise a plurality of spine switches including at least one spine switch configured to forward packets only to others of the plurality of spine switches.

20. The apparatus according to claim 1, wherein the spine switches forward packets only to the one or more leaf switches or to other spine switches.

21. The apparatus according to claim 1, wherein the at least one inner partition includes packet classification entries which indicate that packets corresponding to the entries are to be returned to the leaf switch from which they arrived.

22. The apparatus according to claim 1, wherein the database comprises an access control list (ACL).

23. The apparatus according to claim 1, wherein the database comprises a routing table, which matches Internet protocol (IP) addresses to forwarding decisions.

24. A method for packet classification, comprising:
providing a hierarchical arrangement of switches, including one or more leaf switches and one or more spine switches, each of the switches comprising multiple ports including physical layer and medium access control circuits and a memory, the ports of the one or more leaf switches comprising external ports for connection to a packet network and internal ports, which are connected to the ports of at least one of the spine switches;
partitioning a database of packet classification entries into an outer partition and at least one inner partition;
storing the outer partition in the memory of each of the one or more leaf switches;
storing the at least one inner partition in the memory of each of the one or more spine switches;
receiving packets from the packet network through the external ports of the one or more leaf switches;
matching the received packets to the packet classification entries in the memory of at least one of the leaf and spine switches; and
forwarding the received packets through the ports responsively to the matching packet classification entries.

25. The method according to claim 24, wherein forwarding the received packets comprises, upon matching a received packet to an entry in the outer partition, forwarding the received packet through one of the external ports responsively to the matching entry, and otherwise forwarding the received packet through one of the internal ports for handling by one of the spine switches.

26. The method according to claim 24, wherein matching the received packets comprises, upon receiving a packet in one of the spine switches through one of the internal ports, matching the received packet to one of the entries in the at least one inner partition, and then returning the received packet, responsively to the matching entry, to one of the leaf switches for forwarding to the packet network.

27. The method according to claim 24, wherein the one or more spine switches comprise at least one first spine switch and at least one second spine switch, and wherein the at least one inner partition comprises at least one first partition, which is stored in the memory of the at least one first spine switch, and at least one second partition, which is stored in the memory of the at least one second spine switch, wherein the at least one second partition includes different entries from those in the at least one first partition.

28. The method according to claim 27, wherein the at least one first spine switch and the at least one second spine switch are arranged respectively in first and second tiers, such that the ports of the at least one first spine switch comprise first ports that are connected to the internal ports of the one or more leaf switches, and second ports that are connected to the ports of the at least one second spine switch,
wherein forwarding the received packets comprises, upon matching a received packet to an entry in the at least one first partition that is stored in the at least one first spine switch, forwarding the received packet through one of the first ports to one of the leaf switches responsively to the matching entry, and otherwise forwarding the received packet via one of the second ports for handling by the at least one second spine switch.

29. The method according to claim 27, wherein the ports of both the at least one first spine switch and the at least one second spine switch are connected to the internal ports of the one or more leaf switches, and
wherein forwarding the received packets comprises, upon failing to match a received packet to any of the entries in the outer partition that is stored in one of the leaf switches, applying a predefined rule to the received packet in order to select one of the spine switches having entries appropriate to handle the received packet and to forward the received packet through one of the internal ports to the selected one of the spine switches.

30. The method according to claim 24, wherein the one or more leaf switches comprise multiple leaf switches, and wherein the memory of each of the leaf switches contains a respective same copy of the outer partition.

31. The method according to claim 30, wherein the one or more spine switches comprise multiple spine switches, which are each connected to at least one of the internal ports of every one of the leaf switches.

32. The method according to claim 24, wherein the switches all comprise identical integrated circuit components.

33. The method according to claim 24, wherein the memory is selected from a set of memory types consisting of static random-access memory (SRAM) and ternary content-addressable memory (TCAM).

34. The method according to claim 24, and comprising discarding at least some of the received packets responsively to the packet classification entries in the memory.

35. The method according to claim 24, wherein matching the received packets comprises extracting a respective key from each of the received packets, and performing a longest-prefix match between the key and the packet classification entries in the memory.

* * * * *